United States Patent [19]

Buné

[11] Patent Number: 5,159,565
[45] Date of Patent: Oct. 27, 1992

[54] METHOD FOR THE DETERMINATION OF FIR FILTER COEFFICIENTS IN EQUALIZERS

[75] Inventor: Paul Buné, Stuttgart, Fed. Rep. of Germany

[73] Assignee: Alcatel N.V., Amsterdam, Netherlands

[21] Appl. No.: 672,560

[22] Filed: Mar. 20, 1991

[30] Foreign Application Priority Data

Mar. 28, 1990 [EP] European Pat. Off. ............ 90105906

[51] Int. Cl.⁵ ............................................. G06F 15/31
[52] U.S. Cl. .......................... 364/724.16; 364/724.20; 364/724.12
[58] Field of Search ...................... 364/724.01, 724.19, 364/724.12, 724.16, 724.17, 724.20

[56] References Cited

U.S. PATENT DOCUMENTS

| | | | |
|---|---|---|---|
| 4,468,786 | 8/1984 | Davis | 364/724.20 |
| 4,539,690 | 9/1985 | Speidel | 364/724.20 |
| 4,847,797 | 7/1989 | Picchi et al. | 364/724.20 |
| 5,014,232 | 5/1991 | André364 | 724.19/ |
| 5,050,186 | 9/1991 | Gurcan et al. | 364/724.20 |

OTHER PUBLICATIONS

J. M. Wozencraft & I. M. Jacobs, "Principles of Communication Engineering", Wiley & Sons 1965, pp. 266–273.
J. G. Proakis, "Digital Communications", Mc-Graw-Hill 1983, pp. 410–413.
39th IEEE Vehicular Technology Conference, 1989, pp. 147–154, "Effective Low-Effort Adaptive Equalizers for Digital Mobilophone Systems", Paul A. M. Buné et al.

*Primary Examiner*—Long T. Nguyen
*Attorney, Agent, or Firm*—Spencer, Frank & Schneider

[57] ABSTRACT

A method of creating an finite impulse response (FIR) filter adapted to the channel impulse response of a time-dispersive transmission channel includes the steps of providing several FIR sub-filters in parallel, selecting the tap locations of each sub-filter, determining the sub-filter tap coefficients in such a manner that the output impulse responses of the sub-filters are partially or entirely orthogonal with respect to each other, and creating an FIR filter by weighting the combination of parallel sub-filters to create a FIR filter.

9 Claims, 2 Drawing Sheets

METHOD FOR THE DETERMINATION OF FIR FILTER COEFFICIENTS IN EQUALIZERS

BACKGROUND OF THE INVENTION

In land mobile communications, multiple radio wave reflections lead to a confluence at a receiver of several signals which all stem from the same signal generated by a transmitter but differ in arrival time, carrier phase and amplitude. This can impair the transmission performance and cause fading or even signal elimination at the receiving station. These so-called multipath effects particularly appear in urban environments, which are at the same time those areas with the highest demand for mobile communication systems.

The high bit rates (>200 kbit/s) of modern digital mobile radio systems cause a significant part of the typical multipath effects to appear as inter-symbol interference (ISI), which can be handled by suitable echo-cancelling equalizers.

A receiver concept in which the digital processing part has been maximized with respect to the analog processing part is disclosed by Paul A. M. Buné "Effective Low Effort Adaptive Equalizers for Digital Mobilophone System", 39th IEEE Vehicular Technology Conference, San Francisco, 1989.

This receiver comprises means for low-pass filtering of the received signal, coherent I/Q sampling and A/D conversion, estimation of the complex channel impulse response (CIR) and filtering by an adaptive matched filter (AMF). If desired, the AMF output can be led directly through a threshold device for reconstruction of the binary signal or can be further processed (equalization, decoding).

Equalizers widely used in telecommunication systems are transversal equalizers and decision-feedback equalizers (DFEs), as these basic structures are very simple and suitable for real-time signal processing, employing either dedicated hardware or programmable digital signal processors (DSPs). The equalizer structure typically comprises a finite impulse response (FIR) filter, eventually combined with a symbol detector (usually a threshold device). The FIR filter tap coefficients have to be adapted to the input impulse response, for which several techniques have been developed and described in the literature. These techniques can roughly be separated into simple but slow, and fast but complex algorithms.

The first type of algorithms includes the zero-forcing algorithm and the mean-square-error (MSE) gradient algorithm, together with their variations. They are very useful for constant or slowly varying dispersive channels such as wired links and fixed radio links, but their performance is sensitive to rapid channel variations which are typical for mobile radio. Their adaption speed can be increased considerably using Kalman or fast Kalman algorithms, but this leads to more complexity and, consequently, to a larger processing effort.

Another strategy for tap adaptation is the computation directly from the channel impulse response, but the methods given in the literature typically involve the computation of either the solution of a set of linear equations or the inversion of a matrix, thus also representing relatively high processing loads when the channel parameters are changing rapidly, as a result, the equalizer therefore has to be updated frequently.

SUMMARY OF THE INVENTION

It is the object of the present invention to provide a method for determining a FIR filter for equalization which computes the tap coefficient values directly from the channel impulse response just as well, but requires considerably less effort than the "standard" algorithms.

This object of the invention is achieved by a method of creating, either by computation or by composition, a finite impulse response (FIR) filter of an equalizer where the FIR filter is adapted to a momentary channel impulse response of a time-dispersive transmission channel. The method includes the steps of creating several FIR subfilters in parallel, selecting the tap locations of each subfilter, determining the sub-filter tap coefficients in such a manner that the output impulse responses of the sub-filters (which are equal to the convolutions of the respective subfilter impulse responses with the channel impulse response) are partially or entirely orthogonal with respect to each other, and creating an FIR filter by weighted combination of the parallel sub-filters.

Further advantageous aspects of the invention will become apparent to those skilled in the art in the following description.

The new algorithm can be used for the adaptation of the coefficients of e.g. a transversal equalizer or a decision-feedback equalizer (DFE) to a time-dispersive transmission channel. It combines good inter-symbol interference (ISI) reduction properties with relatively low effort for the equalizer adaptation as well as for the equalization process itself, using an adaptive tap constellation technique in which the separate tap positions do not need to be fixed beforehand in the equalizer. This results in an increased flexibility of the tap setting algorithm as well as a larger efficiency of the FIR filter, as the number of taps can be reduced without (significant) loss of performance.

BRIEF DESCRIPTION OF THE DRAWING

The invention will be understood from the following description in conjunction with the accompanying drawings in which.

DESCRIPTION OF THE PREFERRED EMBODIMENT

Figure 1:
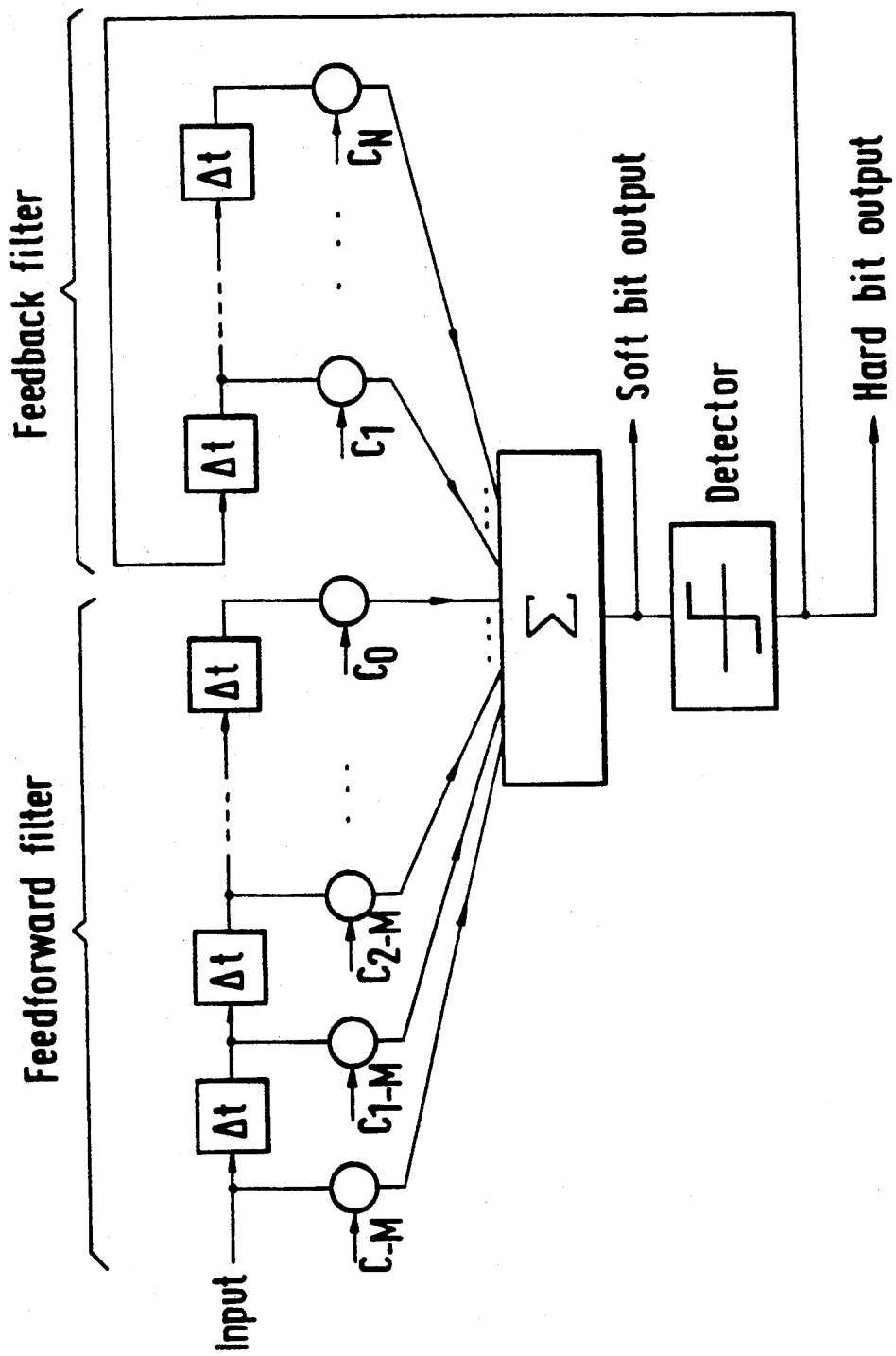
FIG. 1 shows the primary structure of a decision-feedback equalizer.
Figure 2:
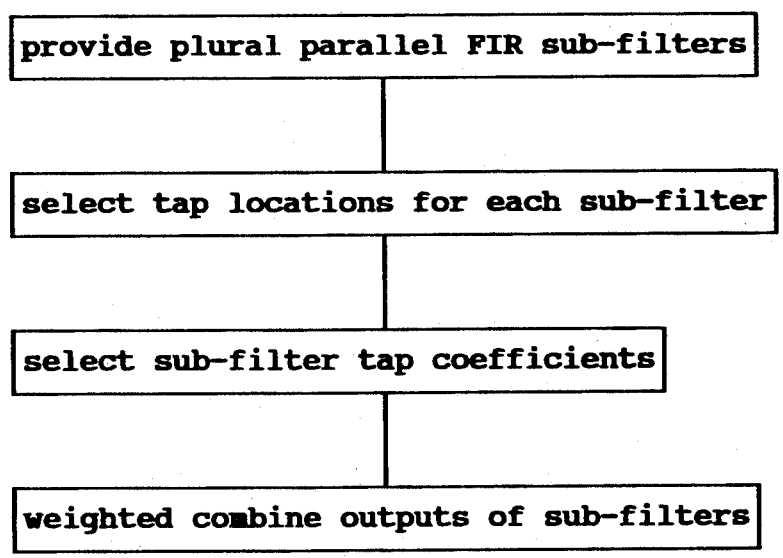
FIG. 2 is a flow chart of an embodiment of the method according to the invention.

This equalizer comprises a feedforward part, to which the equalizer input is fed, and a feedback part, to which the threshold-detected equalizer output symbols are fed. Both parts consist of an FIR filter, and their respective outputs are added to each other to form the equalizer output before threshold detection.

DESCRIPTION OF THE LOW-EFFORT EQUALIZER

Given an M-ary (complex) sequence $v = v_{-\infty}, \ldots, v_{\infty}$, originating from a random data or discrete signal source, and led through a noiseless but dispersive discrete channel with a (complex) impulse response $h = h_{-\infty}, \ldots, h_0, \ldots, h_{\infty}$, where $|h_0| \geq |h_k|$, $k \neq 0$ (In case a given impulse response does not meet these specifications, it can simply be adapted by an adequate index shift). The channel output sequence X is then given by $$x_k = h_k * v_k \stackrel{\Delta}{=} \sum_{i=-\infty}^{\infty} h_i v_{k-i}$$

or, in shorthand, $$x = h*v$$

where '*' denotes discrete convolution.

Also, given a discrete transversal filter with (complex) filter coefficients $g = g_{-M}, \ldots, g_0, \ldots, g_N$ ($M,N \geq 0$), its impulse response is equal to g. When the sequence x is led through this filter, its output sequence y is given by $$y = g*x = g*(h*v) = (g*h)*v = f*v$$

where $f = f_{-\infty}, \ldots, f_0, \ldots, f_\infty = g*h$, the overall impulse response of the series connection of channel and transversal filter.

The low-effort equalizer comprises either an FIR (finite impulse response) filter alone, called a linear or transversal equalizer, or a combination of two FIR filters and a detector device, comprising a DFE (decision-feedback equalizer). The tap settings g are computed directly from (an actual estimation of) the channel impulse response h, which has to be known before the equalization process takes place. Once computed, the tap settings can either be kept constant during the equalization process over a longer number of subsequent symbols, or they can be updated repetitively using an adequate adaptation algorithm, which evaluates the equalizer output (e.g. the MSE (mean-square-error) gradient algorithm).

If the input impulse response h is not known beforehand or available from an external source, an estimation of it can eventually be obtained by the evaluation of the received signal itself. If it consists of modulated information data which fulfils certain statistical requirements, i.e. when it is "random" enough (which is normally the case), h can be extracted by observation of the input signal using an adaptive channel dispersion estimator (J. G. Proakis, "Digital Communications", McGraw-Hill 1983, p. 411). The estimation can be improved by insertion of a special training sequence (known by the receiver) into the data burst. If h is likely to vary significantly during a data burst, the estimation can be repeated several times over different regions in the burst, using either the information data or training sequences, adapting the equalizer to the varying impulse response when required.

EQUALIZER TAP SETTING ALGORITHM

A minimization zone M is defined in h. Theoretically, M can be one of each possible collection of indexes in which each index occurs once at most and which does not include zero. In the case of a transversal equalizer, $M = \{-\infty, \ldots, -1, 1, \ldots, \infty\}$; for a decision-feedback equalizer, $M = \{-\infty, \ldots, -1\}$. In the latter case, the tap setting algorithm delivers the coefficients for the feedforward filter, while the taps for the feedback filter are derived from the resulting output impulse response f of the feedforward filter.

Also, a performance function is defined $$P_h(g) \stackrel{\Delta}{=} \frac{|f_0|^2}{\sum_{m \in M} |f_m|^2}$$

For a given tap constellation, the algorithm delivers the tap values such that $P_h(g)$ is maximal.

Each FIR filter with a (complex) impulse response g can be thought to be composed out of several sub-FIR filters with respective impulse responses $g^{(0)}, g^{(1)}, \ldots$, of which the output signals are weighted linearly with (complex) weighting factors $w^{(0)}, w^{(1)}, \ldots$ and accumulated, so that $g = w^{(0)}g^{(0)} + w^{(1)}g^{(1)} + \ldots$ The same applies to the respective output impulse responses $f^{(i)} = g^{(i)}*h$, $i \geq 0$, i.e. $f = g*h = w^{(0)}f^{(0)} + w^{(1)}f^{(1)} + \ldots$ Take the first sub-filter to be the identity FIR filter, i.e. $g^{(0)} = \delta_0$, where $\delta_0 = 0, \ldots, 0, 1, 0, \ldots, 0$ ($\delta_{00} = 1$) represents the discrete (Kronecker) delta function. The output of this filter is thus equal to its input, i.e. $f^{(0)} = \delta_0 * h = h$. This FIR filter contains just one tap at position 0 with value $g_0^{(0)} = 1$.

Take each subsequent sub-filter $g^{(n)}, n \geq 1$ to contain taps at the same positions as in the preceding sub-filter $g^{(n-1)}$, extended by one more at a different location inside the minimization zone M. Thus, each sub-filter $g^{(n)}$ contains $n+1$ taps, one tap being at position 0. Note that the taps can, but do not have to, neighbour each other. For example, the second tap in the second sub-filter can be at position 1 or $-1$ (and thus be a neighbour of the first tap with index $m_0 = 0$), but it is allowed to put it at any other location inside M. The actual tap index of the second tap is denoted by $m_1$. The third tap (with tap index $m_2$), which appears at first in the third sub-filter, can thus eventually appear between the first and the second tap. Therefore, the tap constellation of each sub-filter (and of the total filter, too) can show "empty spots" between the taps.

The n-th sub-filter tap setting $g^{(n)}$ is computed such that $f^{(n)}$ is orthogonal to $f^{(0)}, \ldots, f^{(n-1)}$ over the minimization zone M, i.e.

$$\langle f^{(n)}, f^{(j)} \rangle_M \stackrel{\Delta}{=} \sum_{m \in M} f_m^{(n)*} f_m^{(j)} = 0$$

for $n \neq j$ where "$\langle \ldots, \ldots \rangle_M$" represents the scalar product over M and "*" denotes a complex conjugate.

A straightforward method to obtain the aquequate tap settings is the Gram-Schmidt orthogonalization procedure (See J. M. Wozencraft & I. M. Jacobs, "Principles of Communication Engineering", Wiley & Sons 1965, p. 266). For the $(n+1)$-th sub-filter, first select the tap location $m = m_n$ for the extension of the tap constellation. The index $m_n$ should not appear in tap constellation of the previous sub-filter $m_0 \ldots m_{n-1}$, but it should be within the minimization zone M. Then, set the initial tap setting $g^{(n)}$ to $g_m^{(n)} = 1$ for $i \neq m$. Thus, $g^{(n)} := \delta_m$ (":=" here indicates an initialization or change, rather than equation) and $f^{(n)} = \delta_m * h$ is equal to h shifted by m elements. For $i = 0, \ldots, n-1$, perform the following set of computations:

$$\phi_{ni} := \frac{\langle f^{(i)}, f^{(n)} \rangle_M}{\langle f^{(i)}, f^{(i)} \rangle_M}$$

$$f^{(n)} := f^{(n)} - \phi_{ni} f^{(i)}$$

-continued $$g^{(n)} := g^{(n)} - \phi_n \tilde{g}^{(i)}$$

The corresponding weighting parameter for the output of the (n+1)-th sub-filter is computed and the equalizer tape are updated as follows:

$$w^{(n)} := \frac{f_0^{(n)*}}{<f^{(n)}, f^{(n)}>_M}$$

$$g := g + w^{(n)} g^{(n)}$$

For the first sub-filter, the weighting parameter $w^{(0)}$ is computed in the same way using $f^{(0)} = h$, thus g is initialized by $$g := w^{(0)} g^{(0)} = w^{(0)} \delta_0. \text{ For the sub-filters,}$$

$$, P_h(g^{(n)}) = w^{(n)} f_0^{(n)}$$

and it follows for the final filter that $$P_h(g) = \sum_n P_h(g^{(n)})$$

which shows that it can be determined directly to what extent the separate sub-filters contribute to the performance function of the total filter.

There are several ways for the selection of the extra tap when a new sub-filter is initialized. Three possible alternatives (which are given in the order of increasing computation effort) are:

The number as well as the positions of the taps are already fixed beforehand. For each new sub-filter, the extra tap is then just one of the taps in the given collection which has not yet been taken in the previous sub-filters. The order in which the taps are subsequently selected is not relevant;

Only the number of the taps is fixed. Then, one possible way to select a tap for a new sub-filter is to investigate the total output impulse response of the filter which has been realized with the already existing sub-filters. Then, among its elements or "empty spots" which do not correspond with one of the tap indexes already included, the index of the element with the highest absolute value is chosen to be the new tap index;

Another possibility when only the final number of taps is fixed is the computation of the performance function $P_h(g^{(n)})$ for the n-th subfilter for each yet unused tap index which are inside a given region (which should contain more indexes as the final number of taps), and to select the index which yielded the highest value.

With each computation of a new sub-filter, the already existing sub-filters and their output weighting parameters are not affected. However, as the practical version of the equalizer comprises one FIR filter with its coefficients being the weighted sum of the tap settings of the sub-filters, the addition of a new sub-filter (which implies the addition of a new tap into the tap constellation) typically affects the values of all taps previously set up in the total filter.

A slightly different tap setting algorithm which shows the same behavior with respect to the tap settings can be constructed by extending the (minimization) index zone, over which all scalar products $< \ldots, \ldots >$ are computed, with the index 0.

If the input impulse response h is real-valued (e.g., the output impulse response of an adaptive matched filter), all computations will stay unchanged but with real-valued variables.

If the tap setting algorithm is used for a transversal equalizer and h is known to be symmetrical about zero (e.g., the output impulse response of an adaptive matched filter), the optimal tap constellation is also symmetrical. In that case, processing efforts can be saved by forcing the sub-filters to be symmetrical beforehand, which can be performed by initializing each new sub-filter with the symmetrical tap setting $\delta_m + \delta_{-m}$ rather than $\delta_m$, and by computing only the taps with the positive (or, for that matter, the negative) indexes.

I claim:

1. In a decision-feedback equalizer having a feedforward filter portion receiving input to the equalizer and a feedback filter portion, each portion forming a finite impulse response filter and having a respective output, the outputs of the filter portions being combined in an adder, an output of the adder being provided to a threshold detector, an output of the threshold detector being provided as input to the feedback filter portion, the adder output and the threshold detector output being first and second outputs of the equalizer, respectively, a method of implementing the filters comprising:
   providing a plurality of parallel finite impulse response sub-filters having an impulse response;
   selecting tap locations for obtaining an output from each sub-filter, each tap location having an associated tap coefficient;
   selecting the sub-filter tap coefficients for each sub-filter tap so that output impulse responses of the sub-filters are at least partially mutually orthogonal, an output impulse response of a respective sub-filter being equal to a convolution of a channel impulse response and the respective sub-filter impulse response; and
   weighted combining of outputs of the plurality of sub-filters to produce the finite impulse response filter output.

2. A method as claimed in claim 1, wherein the steps of providing and selecting comprise the steps of:
   providing a first sub-filter;
   selecting a tap location for the first sub-filter to a tap at the zero location; and
   selecting a tap coefficient for the tap location of the first sub-filter to have a value of 1;
   and wherein each subsequent sub-filter provided has taps selected to be at the same locations as a preceding sub-filter and an additional tap at a different location.

3. A method as claimed in claim 2, wherein the location of the additional tap of each sub-filter subsequent to the first sub-filter is selected so that each respective subsequent sub-filter is an optimal equalization filter, according to a given equalizer performance criterion, with respect to the output impulse response of the finite impulse response filter implemented by the method.

4. A method as claimed in claim 2, wherein the location of the additional tap of each subsequent sub-filter is selected to be at the location of the coefficient with the highest absolute value in the output impulse response of the finite impulse response filter implemented by the method, the additional tap location not being covered by taps in a preceding sub-filter.

5. A method according to claim 1, wherein said step of selecting the sub-filter tap coefficients for each sub-filter tap comprises selecting so that the output impulse responses of the sub-filters are entirely mutually orthogonal.

6. A method according to claim 1, wherein the step of selecting tap locations includes the step of computing a tap setting.

7. In a linear equalizer comprising a finite impulse response filter having a plurality of taps, each tap having an associated coefficient value and producing a respective output, the outputs being combined in an adder, an output of the adder being provided to a threshold detector, a method of implementing the filter comprising:

providing a plurality of parallel finite impulse response sub-filters, each sub-filter having an impulse response;

selecting tap locations for obtaining an output from each sub-filter, each tap location having an associated tap coefficient;

selecting the sub-filter tap coefficients for each sub-filter tap so that output impulse responses of the sub-filters are at least partially mutually orthogonal, an output impulse response of a respective sub-filter being equal to a convolution of a channel impulse response and the respective sub-filter impulse response; and weighted combining of outputs of the plurality of sub-filters to produce the finite impulse response filter output.

8. A method as claimed in claim 7, wherein the steps of providing and selecting comprise the steps of:

providing a first sub-filter;

selecting a tap location for the first sub-filter to a tap at the zero location; and selecting a tap coefficient for the tap location of the first sub-filter to have a value of 1;

and wherein each subsequent sub-filter provided has taps selected to be at the same locations as a preceding sub-filter and an additional tap at a different location.

9. A method as claimed in claim 8, wherein when the channel impulse response is assumed or known to be symmetrical about zero and the equalizer is a transversal equalizer, wherein each subsequent sub-filter is provided with taps at the same locations as a preceding sub-filter and two additional taps at two different locations symmetrical about the zero location.

* * * * *